(12) United States Patent
Eilert et al.

(10) Patent No.: US 10,001,231 B2
(45) Date of Patent: Jun. 19, 2018

(54) COUPLING ARRANGEMENT FOR PIPELINES

(71) Applicant: MANN+HUMMEL GMBH, Ludwigsburg (DE)

(72) Inventors: Lorenz Eilert, Braunschweig (DE); Guido Regener, Klein Denkte (DE); Stefan Sinkemat, Bad Harzburg (DE); Joerg Homann, Braunschweig (DE); Udo Fischer, Braunschweig (DE); Robert Lachut, Vienenburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 200 days.

(21) Appl. No.: 15/005,465

(22) Filed: Jan. 25, 2016

(65) Prior Publication Data

US 2016/0138741 A1    May 19, 2016

Related U.S. Application Data

(63) Continuation of application No. PCT/EP2014/064408, filed on Jul. 7, 2014.

(30) Foreign Application Priority Data

Jul. 25, 2013   (DE) .................. 10 2013 012 369

(51) Int. Cl.
*F16L 27/10* (2006.01)
*F16L 21/08* (2006.01)
(Continued)

(52) U.S. Cl.
CPC ............... *F16L 21/08* (2013.01); *F16L 37/08* (2013.01); *F16L 37/252* (2013.01); *F16L 37/52* (2013.01)

(58) Field of Classification Search
CPC ......... F16L 21/08; F16L 27/04; F16L 27/026; F16L 27/125
(Continued)

(56) References Cited

U.S. PATENT DOCUMENTS 3,596,934 A * 8/1971 De Cenzo ........... F16L 27/1136
285/145.1
4,150,847 A * 4/1979 De Cenzo ........... F16L 19/0218
285/233

(Continued)

FOREIGN PATENT DOCUMENTS

CN          101619793 A     1/2010
DE          1910988 A1      9/1969
(Continued)

*Primary Examiner* — Aaron M Dunwoody
(74) *Attorney, Agent, or Firm* — James Hasselbeck

(57) ABSTRACT

The invention relates to a coupling arrangement (10) for pipelines, with a female coupling section (20) and a male coupling section (40) as well as a locking element (60) which at least in regions engages between the coupling sections (20, 40) and is secured on a coupling section (20), one of the coupling sections (20) comprising a locking contour (34) which cooperates with a locking contour (64) of the locking element (60), and the locking element (60) having a blocking section (62) which cooperates with a blocking section (52) of the other coupling section (40) such that a lateral movement between the coupling sections (20, 40) can be restricted.

13 Claims, 4 Drawing Sheets

(51) Int. Cl.
*F16L 37/252* (2006.01)
*F16L 37/52* (2006.01)
*F16L 37/08* (2006.01)

(58) Field of Classification Search
USPC ............... 285/223, 233, 234, 272, 261, 271
See application file for complete search history.

(56) References Cited

U.S. PATENT DOCUMENTS

| | | | |
|---|---|---|---|
| 4,522,433 A * | 6/1985 | Valentine | F16L 27/026 285/233 |
| 5,106,129 A * | 4/1992 | Camacho | F16L 27/026 277/616 |
| 5,188,400 A * | 2/1993 | Riley | F16L 23/06 24/19 |
| 5,772,254 A * | 6/1998 | Felber | F16L 27/06 285/16 |
| 6,062,611 A | 5/2000 | Percebois et al. | |
| 6,846,022 B2 | 1/2005 | Takagi | |
| 7,165,635 B2 * | 1/2007 | Kauffman | E21B 17/05 166/344 |
| 7,806,445 B2 | 10/2010 | Mutschlechner et al. | |
| 8,360,477 B2 * | 1/2013 | Flynn | F16L 25/01 285/145.1 |
| 2005/0264007 A1 | 12/2005 | Porter | |
| 2011/0225789 A1 | 9/2011 | Darnell | |
| 2014/0035276 A1 * | 2/2014 | Jaffari | F16L 27/1017 285/144.1 |

FOREIGN PATENT DOCUMENTS

| | | |
|---|---|---|
| DE | 2755804 A1 | 6/1978 |
| DE | 4019408 A1 | 12/1991 |
| DE | 102007046203 A1 | 5/2008 |
| EP | 1092908 B1 | 3/2004 |
| EP | 1488155 B1 | 8/2005 |
| EP | 1657372 A2 | 5/2006 |
| EP | 2286132 A1 | 2/2011 |
| FR | 1469580 A | 2/1967 |

* cited by examiner

COUPLING ARRANGEMENT FOR PIPELINES

CROSS-REFERENCE TO RELATED APPLICATIONS

This application is a continuation application of international application No. PCT/EP2014/064408 having an international filing date of 7 Jul. 2014 and designating the United States, the international application claiming a priority date of 25 Jul. 2013, based on prior filed German patent application No. 10 2013 012 369.0, the entire contents of the aforesaid international application and the aforesaid German patent application being incorporated herein by reference.

TECHNICAL FIELD

The invention relates to a coupling arrangement for pipelines, in particular for establishing a quasi-rigid pipe connection.

BACKGROUND

A coupling arrangement for pipes is known from EP2286132 A1, in which a pipe sleeve connects a male and a female pipe part. The pipe sleeve cooperates with an inner contour of the female pipe part in order to couple a pipe that can be received in the pipe receptacle to the female pipe part in a hinged manner. For this purpose, the receptacle has a pipe stop formed from pipe sections which protrude from an inner wall of the pipe sleeve.

SUMMARY OF THE INVENTION

It is an object of the invention to provide a coupling arrangement which is inexpensive and can be assembled in a simple manner, and which is particularly suitable for quasi-rigid pipe connections.

The aforementioned object is achieved with a coupling arrangement that has two coupling sections and a locking element which at least in regions engages between the coupling sections and is secured on a coupling section, wherein the locking element restricts a lateral relative movement of the coupling sections.

Favorable configurations and advantages of the invention arise from the further claims, the description and the drawing.

Proposed is a coupling arrangement with a female coupling section and a male coupling section as well as a locking element which at least in regions engages between the coupling sections and is secured on one of the coupling sections, wherein one of the coupling sections has a locking contour which cooperates with a locking contour of the locking element, and wherein the locking element has a blocking section which cooperates with a blocking section of the other coupling section such that a lateral movement between the coupling sections can be restricted.

In contrast to the prior art, no separate sleeve or union nut is required for fixing a connection between the coupling sections since a spherical section on the male coupling section can be formed directly from the component of the coupling section. Thus, no end stop for the respective coupling section is necessary. Use of complicated and expensive rubber elements for compensating movements during assembly or a temperature change during operation can be avoided.

The coupling arrangement according to the invention is particularly suitable for establishing a rigid or quasi-rigid connection, for example in the case of charge air lines in motor vehicles or connections without dynamic movement loads, in particular with high temperature and pressure loads of the connection. The coupling arrangement is capable of easily compensating the movements resulting from the installation or from slight position changes between connection points. It is possible to compensate length changes of a few millimeters as well as angular errors of a few degrees between the coupling sections without single-sided introduction of stress into the coupling arrangement.

In particular, by providing two coupling sections, for example in a pipeline, movements between connection elements of rigid connections can be compensated with only minor deviations. The coupling sections can be end sections of two pipelines to be connected.

According to a favorable configuration, the blocking section of the locking element and the blocking section of the coupling section can form a positive-locking fit upon contact. Hereby, the male coupling section can be effectively prevented from undesirably sliding out of the coupling arrangement.

Particularly advantageously, the locking element can be formed as a wedge ring. The locking element can have a contact surface on an end face of the female coupling section and a collar which engages between the coupling sections. Thus, the locking element can be assembled in a simple and space-saving manner. Advantageously, the blocking section can be arranged on an inner side of the wedge ring, and the locking contour can be arranged on an outer side of the wedge ring. For example, the locking contour can be formed as a latching hook at the radially inner surface of which the blocking section is formed, e.g. in the form of a surface region that is formed complementary to the blocking section of the male coupling section. However, an alternative configuration where the locking element is shackle-shaped with an outside leg and an inside leg is also conceivable. Then, the locking contour can be provided on the outside leg and the blocking section can be provided on the inside leg. In this case, the outside locking contour can cooperate with a locking contour on the outer side of the female coupling section and the blocking section on the inside leg can cooperate with the blocking section of the male coupling section.

Advantageously, the male coupling piece can have a sealing groove on its outer surface. In this manner, a pressure-tight connection can be ensured.

Expediently, the diameter of the locking element can be reversibly expandable for the intended assembly. For example, a slot can be provided in the locking element. Thus, the locking element can easily be expanded during assembly in order to slide it onto the respective coupling part.

Favorably, the blocking section at the coupling section can form a region of an outer surface of a thickening at the face side of the male coupling section. This allows a very compact arrangement without additional components.

Particularly advantageously, the blocking section at the coupling section can be formed to be crowned at least in certain regions. Thus, spherical mounting of the coupling sections can be achieved, whereby the compensation of angular errors can be facilitated in a particularly effective manner. The connection between the coupling sections can be created without the need for inserting the male coupling piece into the female coupling piece at a specific angle and without subsequent locking, which simplifies the assembly.

Furthermore, the crowned shape of the locking has the advantage that due to this design, the reaction forces generated by the inner pressure result in uniform force transmission into the connection geometry, even in the case of an angular offset between the join partners. Thus, no return torques are generated in the coupling arrangement.

According to another configuration, the locking contour of the female coupling section can be arranged on an inner side of the female coupling section.

Advantageously, the locking contours can be formed as a bayonet connection or latching connection. Both allow simple and secure assembly.

According to another aspect of the invention, a coupling section for a coupling arrangement according to the invention is proposed, wherein on an inner side in a receiving region for at least one locking contour of a locking element at least one locking contour is provided. The coupling section can be part of a pipeline which is to be connected to another pipeline via the coupling arrangement.

According to another aspect of the invention, a coupling section for a coupling arrangement according to the invention is proposed, wherein a thickening is provided at a face-side end, the outer surface of the thickening having a region that is provided as a blocking section in the assembled state for cooperating with a blocking section of a locking element. The coupling section can be part of a pipeline which is to be connected to another pipeline via the coupling arrangement. Advantageously, the blocking section of the coupling section is formed to be crowned at least in certain regions.

According to another aspect of the invention, a locking element for a coupling arrangement according to the invention is proposed, wherein radially on the outside, a locking contour is provided for securing the locking element in the assembled state on a first coupling section, and a blocking section for restricting a lateral movement of a second coupling section is provided radially on the inside. The radially inner blocking section is formed to be concave at least in certain regions.

According to another aspect of the invention, a pipeline for a coupling arrangement according to the invention is proposed, the pipe line having at least one coupling section which has a thickening at a face-side end, wherein an outer surface of the thickening has a region which, in the assembled state, is provided as a blocking section for cooperating with a blocking section of a locking element. Particularly advantageous is a shape of the blocking section of the pipeline that is crowned at least in certain regions.

BRIEF DESCRIPTION OF THE DRAWINGS

Further advantages arise from the following description of the drawings. Shown in the drawings are exemplary embodiments of the invention. The drawings, the description and the claims include numerous features in combination. The person skilled in the art will also expediently view the features individually and combine them into meaningful further combinations.

In the figures, by way of example.

Same or similar components in the figures are numbered with the same reference signs. The figures merely show examples and are not to be understood as limiting.

DETAILED DESCRIPTION

Figure 1:
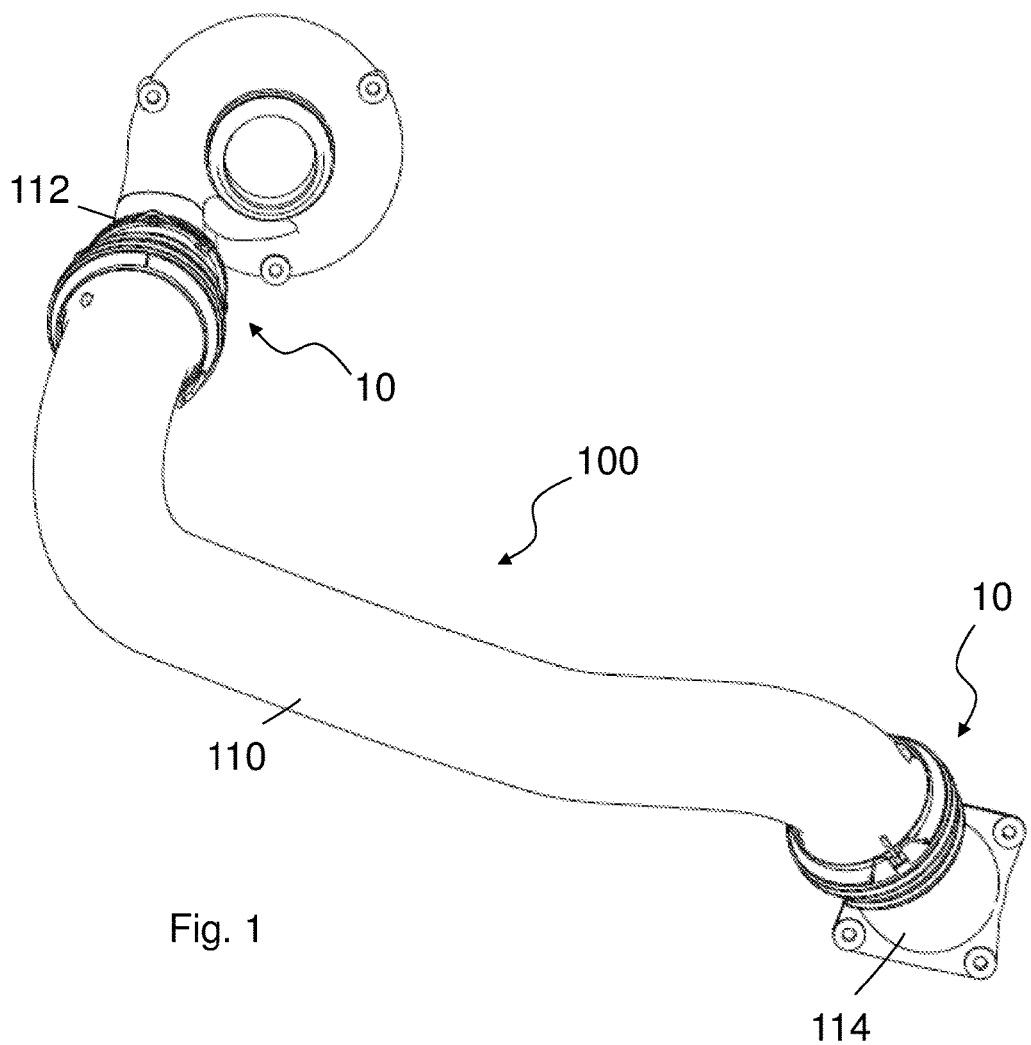
FIG. 1 shows an exemplary embodiment of a charge air pipe of an internal combustion engine with two coupling sections according to a configuration of the invention.

In order to explain the invention, FIG. 1 shows an exemplary embodiment of a charge air pipeline 100 of an internal combustion engine with two coupling arrangements 10 according to a configuration of the invention. The charge air pipe 110 is connected at a first coupling point 112 to a first pipe piece via a first coupling arrangement 10 and is connected at a remotely arranged second coupling point 114 to a second pipe piece via the second coupling arrangement 10. According to the intended use, the charge air pipe connection 110 is rigid or quasi-rigid, i.e., it is not provided for dynamic movements in operation, but rather is substantially immovable and, according to the intended use, shall at most carry out typical small movements due to thermal expansion or during assembly. However, dynamic applications are also conceivable.

The coupling arrangement 10 forms in each case a connection having little movability between two pipes or pipe sections. The coupling arrangement 10 allows a compensation of minor movements between the pipe ends, of tilting movements as well as lateral movements. Thus, the coupling arrangement 10 can compensate tilting of up to 3.5° and a length offset between the two pipes of a few millimeters, approximately +/−3 mm. The differences in movement are not compensated dynamically between the two end points; rather, the coupling arrangement 10 acts merely as a compensation element for assembling the system and for tolerance compensation between two connection points. In order to be able to optimally utilize the advantages of the coupling arrangement 10, it is advisable to provide the coupling arrangement 10 as a pair.

Figure 2:
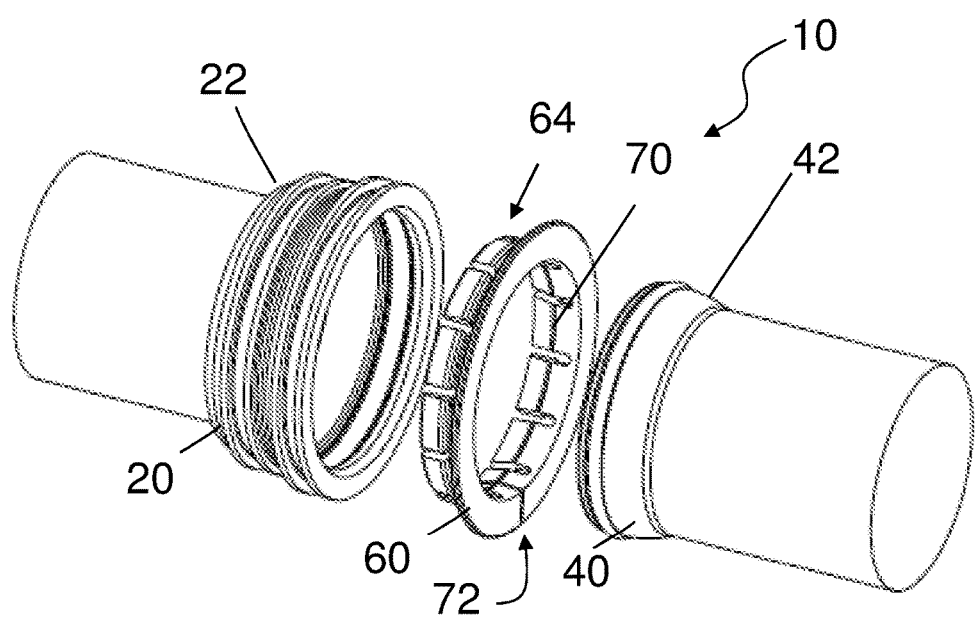
FIG. 2 shows an exploded view of two coupling sections and a locking element of a coupling arrangement according to a configuration of the invention.

FIG. 2 shows an exploded view of two coupling sections 20, 40 and a locking element 60 of a coupling arrangement 10 according to a configuration of the invention.

The coupling arrangement 10 comprises a female coupling section 20 and a male coupling section 40 as well as a locking element 60 which, at least in certain regions, engages between the coupling sections 20, 40. The locking element 60 is formed as a ring, in particular as a wedge ring, and can be widened, for which purpose a slot is provided in the periphery of the locking element 60.

The locking element 60 is secured on a coupling section 20, in particular the female coupling section 20, wherein the respective coupling section 20 has on its inner side (28 in FIGS. 3 and 4) a locking contour (reference sign 34 in FIGS. 3 and 4) which cooperates with a locking contour 64 of the locking element 60, and the locking element 60 has a blocking section 62 which cooperates with a blocking section 52 of the other coupling section 40 such that a lateral movement between the coupling sections 20, 40 can be restricted. In the exemplary embodiment shown, the locking contour 64 is arranged on the outside of a collar 68 which engages between the coupling sections 20, 40, and the blocking section 62 is arranged on the inside 70 of the collar 68.

The female coupling section 20 forms the joint socket 22 and the male coupling section 40 forms a joint ball 42 of a ball joint. The ball socket 22 and the joint ball 42 can be part of another component, for example of a connecting piece, a pipe element or the like.

Figure 3:
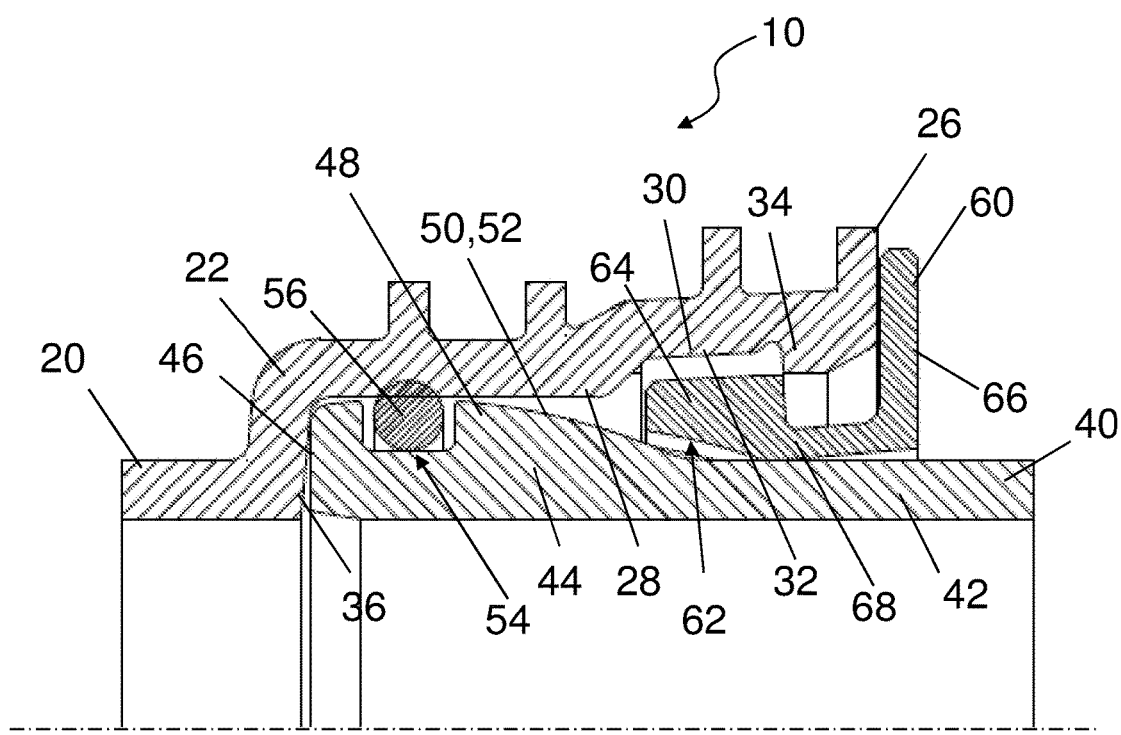
FIG. 3 shows a section through a coupling arrangement according to an exemplary embodiment of the invention with two coupling sections and a locking element prior to securing the locking element on the female coupling section.
Figure 4:
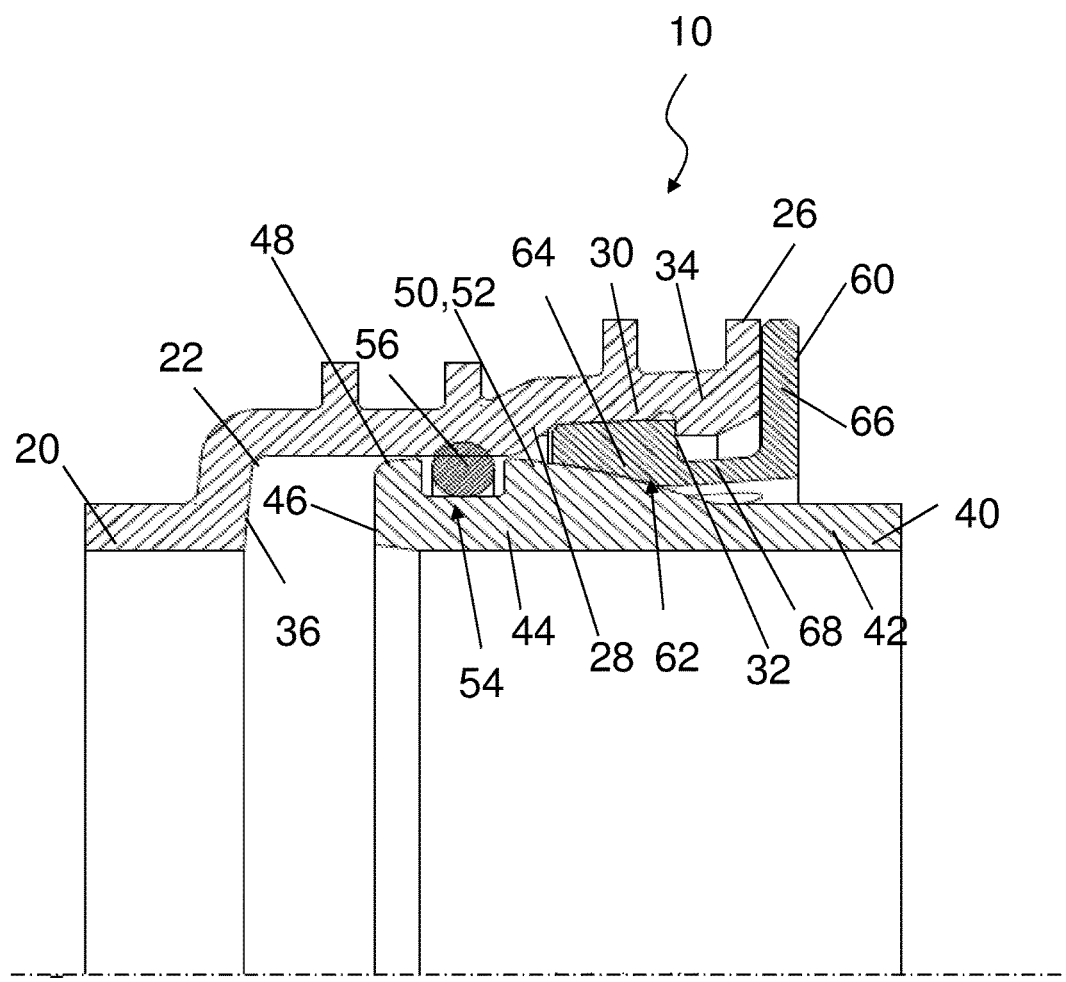
FIG. 4 shows the coupling arrangement of FIG. 3 after securing the locking element on the female coupling section and after inserting the male coupling section.

In a configuration as in FIG. 2, as illustrated in more detail in FIGS. 3 and 4, a thickening 44 is provided in the male coupling section 40 in the region of the front end. The thickening 44 is advantageously formed to be crowned and provides for the ball bearing of the male coupling section 40 in the female coupling section 20.

A sealing groove 54, in which a seal 56, e.g., an O-ring, is inserted in the assembled state, is arranged in the thickened region. The seal 56 serves for a pressure-tight connection of the joint ball 42 and the joint socket 22, i.e., of the female and the male coupling sections 20, 40.

The female coupling section 20 has a widening 30 on the inside near its face side 26, said widening providing space for the locking contour 64 of the locking element 60 and for a receiving space 32.

The locking element 60 is ring-shaped, e.g. formed as a wedge ring and, with a collar 68, engages axially between the coupling sections 20, 40. The collar 68 is provided with a bearing ring 66 which serves for engaging on a face side 26 of the female coupling section 20. A latching connection is formed by the collar 68 having a plurality of locking contours 64, e.g. outward facing latching noses, which cooperate with locking contours 34, e.g. projections facing radially inwards from the inner side 28, of the female coupling section 20 to form the latching connection (i.e. 34 latching with 64).

Radially on the inside, the locking contour 64 of the locking element 60 has a region with a blocking section 62 which is formed corresponding to the form of a blocking section 52 of the male coupling section 40. The blocking section 52 forms a region 50 of the outer surface 48 of the thickening 44 of the male coupling section 40. The locking element 60 serves to fix the locking element 60 on the female coupling section 20 and also to restrict a lateral movement of the male coupling section 40 and thus securely prevents the connection between the coupling sections 20, 40 from disengaging. Lateral movement is only possible between the socket bottom 36 of the female coupling section 20 (joint socket 22) and the blocking section 62 of the locking element 60 because in the one direction, the male coupling section 40 abuts with its face side 46 against the socket bottom 36, and in the opposite direction, the male coupling abuts with its blocking section 52 against the blocking section 62 of the locking element 60.

For assembling the coupling arrangement 10, first, the seal 56 is assembled on the joint ball 42 (male coupling section 40), subsequently, the locking element 60, e.g., in the form of a wedge ring, is slid over the thickening 44 of the male coupling section 40 and thereafter, the joint ball 42 (male coupling section 40) with the seal 56 mounted thereon is pressed with the face side 46 leading into the joint socket 22 (female coupling section 20). In doing so, the wedge ring (locking element 60) lies outside of the thickening 44 on the joint ball 42 (male coupling section 40).

The locking element 60 (wedge ring) is also pressed into the joint socket 22 (female coupling section 20). In doing so, the latching noses (locking contour 64) on the wedge ring (locking element 60) still lie outside of the thickening 44 and their outer diameter can be pressed together until they can pass through under the locking contour 34 on the joint socket 22 (female coupling section 30).

The joint ball 42 and the wedge ring are pressed in until the latching noses (locking contour 64) latch behind the projections (locking contour 34) of the joint socket 22. Since the outer diameter of the locking contour 64 is larger than the inner diameter of the locking contour 34, the wedge ring (locking element 60) is securely locked and can no longer be removed. In the case of a tensile load on the coupling arrangement 10, the wedge ring (locking element 60) acts like a positive-locking connection with respect to the thickening 44 on the joint ball 42 and prevents the coupling arrangement 10 from opening. Here, the blocking section 62 on the inner side of the locking contour 64 of the locking element 60 and the blocking section 52 of the male coupling section 40 on the thickening 44 form the positive-locking fit upon contact in that their shapes are formed complementary, with the blocking section 52 on the thickening 44 being curved convexly towards the outside (crowned) and the blocking section 62 being curved concavely towards the inside, for example.

In order to be able to assemble the wedge ring (locking element 60) over the thickening 44 of the joint ball 42, it is necessary to widen the wedge ring. Therefore, the wedge ring is open at one place (slot 72, FIG. 2) so that the wedge ring can be opened and assembled over the thickening 44 on the joint ball 42.

As an alternative to the locking contours 34, 64 in the form of a latching connection, the locking contours can also be formed as a bayonet connection.

What is claimed is:

1. A coupling arrangement for pipelines adapted to compensate for lateral movement and tilting movements between connection points, comprising:
   a female coupling section; and
   a male coupling section;
   a locking element which is arranged between and engages between the coupling sections and is secured on one of the coupling sections;
   the locking section comprising:
      a locking contour which cooperates with a locking contour of the locking element;
      wherein the locking element has a blocking section which cooperates with a blocking section of the other coupling section such that a lateral movement between the coupling sections can be restricted;
   wherein the locking contours are formed as latching connections.

2. The coupling arrangement according to claim 1, wherein
   the locking contour of the locking element is arranged in a region which engages between the coupling sections.

3. The coupling arrangement according to claim 1, wherein
   the blocking section of the locking element and the blocking section of the coupling section form a positive-locking fit upon contact.

4. The coupling arrangement according to claim 1, wherein
   the locking element is formed as a wedge ring with a bearing surface on a face side of the female coupling section and a collar which engages between the coupling sections.

5. The coupling arrangement according to claim 1, wherein
   a diameter of the locking element is reversibly expandable for an intended assembly of the coupling sections.

6. The coupling arrangement according to claim 1, wherein the locking contour of the female coupling section is arranged on an inner side of the female coupling section.

7. The coupling arrangement according to claim 1, wherein
the male coupling section forms a joint ball;
wherein the female coupling section forms a ball socket into which the joint ball is slidably and tiltably received;
wherein the locking element engages against the male coupling section and the female coupling section to enable and limit lateral movement of the male couple section relative to the female coupling section;
wherein the locking element engages against the male coupling section and the female coupling section to enable and limit angular tilting movement of the male couple section relative to the female coupling section.

8. A coupling section for a coupling arrangement according to claim 1, wherein
on an inner side in a receiving region for at least one locking contour of a locking element at least one locking contour is provided.

9. A coupling section for a coupling arrangement according to claim 1, wherein
a thickening is provided at a face-side end of the coupling section;
wherein an outer surface of the thickening has a region that is provided as a blocking section in an assembled state for cooperating with a blocking section of a locking element.

10. A coupling arrangement for pipelines adapted to compensate for lateral movement and tilting movements between connection points, comprising:
a female coupling section; and
a male coupling section;
a locking element which is arranged between and engages between the coupling sections and is secured on one of the coupling sections;
a locking section comprising:
a locking contour on one of the coupling sections which cooperates with a locking contour of the locking element;
wherein the locking element has a blocking section which cooperates with a blocking section of the other coupling section such that a lateral movement between the coupling sections can be restricted;

wherein the blocking section at the coupling section forms a region of an outer surface of a thickening at the face side of the male coupling section;
wherein the blocking section at the coupling section is formed to be crowned at least in certain regions.

11. The coupling arrangement according to claim 10, wherein
the locking contours are formed as latching connections.

12. A pipeline adapted to compensate for lateral movement and tilting movements between connection points, comprising:
a coupling arrangement for pipelines, comprising:
a female coupling section; and
a male coupling section;
a locking element which is arranged between and engages between the coupling sections and is secured on one of the coupling sections;
the locking section comprising:
a locking contour which cooperates with a locking contour of the locking element;
wherein the locking element has a blocking section which cooperates with a blocking section of the other coupling section such that a lateral movement between the coupling sections can be restricted;
wherein at least one of the coupling sections has a thickening at a face-side end;
wherein an outer surface of the thickening has a region which, in an assembled state, is arranged as a blocking section cooperating with a blocking section of a locking element;
wherein the blocking section at the coupling section is formed to be crowned at least in certain regions.

13. The pipeline according to claim 12, wherein
the male coupling section forms a joint ball;
wherein the female coupling section forms a ball socket into which the joint ball is slidably and tiltably received;
wherein the locking element engages against the male coupling section and the female coupling section to enable and limit lateral movement of the male couple section relative to the female coupling section;
wherein the locking element engages against the male coupling section and the female coupling section to enable and limit angular tilting movement of the male couple section relative to the female coupling section.

* * * * *